`US010944484B2`

(12) United States Patent
Hueda et al.

(10) Patent No.: US 10,944,484 B2
(45) Date of Patent: *Mar. 9, 2021

(54) TAP STABILIZER METHOD AND STRUCTURE FOR COHERENT OPTICAL RECEIVER

(71) Applicant: INPHI CORPORATION, Santa Clara, CA (US)

(72) Inventors: Mario R. Hueda, Santa Clara, CA (US); Oscar E. Agazzi, Santa Clara, CA (US)

(73) Assignee: INPHI CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,674

(22) Filed: Sep. 26, 2019

(65) Prior Publication Data

US 2020/0021366 A1     Jan. 16, 2020

Related U.S. Application Data

(63) Continuation of application No. 16/134,722, filed on Sep. 18, 2018, now Pat. No. 10,476,603, which is a (Continued)

(51) Int. Cl.
*H04B 10/61*     (2013.01)
*H04L 25/03*     (2006.01)
(Continued)

(52) U.S. Cl.
CPC ....... *H04B 10/6162* (2013.01); *H04B 10/079* (2013.01); *H04B 10/615* (2013.01);
(Continued)

(58) Field of Classification Search
CPC .............. H04B 10/6162; H04B 10/079; H04B 10/615; H04B 10/616; H04B 10/6161;
(Continued)

(56) References Cited

U.S. PATENT DOCUMENTS

| | | |
|---|---|---|
| 4,669,116 A | 5/1987 | Agazzi et al. |
| 5,870,372 A | 2/1999 | Kuribayashi |

(Continued)

OTHER PUBLICATIONS

Andreas Leven et al., "Real-Time Implementation of Digital Signal Processing for Coherent Optical Digital Communication Systems", IEEE Journal of Selected Topics in Quantum Electronics, Sep./Oct. 2010, pp. 1227-1234, vol. 16, No. 5, IEEE.

(Continued)

*Primary Examiner* — Dalzid E Singh
(74) *Attorney, Agent, or Firm* — Richard T. Ogawa; Ogawa P.C.

(57) ABSTRACT

A method and structure for a coherent optical receiver device. Timing recovery (TR) is implemented after channel dispersion (i.e., chromatic dispersion (CD) and polarization mode dispersion (PMD)) compensation blocks. This architecture provides both improves performance and reduces power consumption of the device. Also, a TR loop is provided, enabling computing, by an error evaluation module, a first sampling phase error (SPE) and computing, by a timing phase information (TPI) module coupled to the error evaluation module, a second SPE from a plurality of CD equalizer taps PMD equalizer taps. The first and second SPE are combined into a total phase error (TPE) in a combining module, and the resulting TPE is filtered by a timing recovery (TR) filter coupled to an interpolated timing recovery (ITR) module and the combining module. The ITR module then synchronizes an input signal of the coherent optical receiver according to the TPE.

20 Claims, 6 Drawing Sheets

Related U.S. Application Data continuation of application No. 15/792,396, filed on Oct. 24, 2017, now Pat. No. 10,110,319.

(60) Provisional application No. 62/412,052, filed on Oct. 24, 2016, provisional application No. 62/412,071, filed on Oct. 24, 2016, provisional application No. 62/412,033, filed on Oct. 24, 2016, provisional application No. 62/412,047, filed on Oct. 24, 2016, provisional application No. 62/412,015, filed on Oct. 24, 2016, provisional application No. 62/412,002, filed on Oct. 24, 2016, provisional application No. 62/412,039, filed on Oct. 24, 2016.

(51) Int. Cl.
| | |
|---|---|
| *H04L 7/00* | (2006.01) |
| *H04L 27/26* | (2006.01) |
| *H04B 10/079* | (2013.01) |
| *H04L 1/00* | (2006.01) |
| *H04B 10/40* | (2013.01) |

(52) U.S. Cl.
CPC ....... *H04B 10/616* (2013.01); *H04B 10/6161* (2013.01); *H04B 10/6165* (2013.01); *H04L 1/0045* (2013.01); *H04L 7/0075* (2013.01); *H04L 25/03019* (2013.01); *H04L 25/03159* (2013.01); *H04L 27/2662* (2013.01); *H04L 27/2697* (2013.01); *H04B 10/40* (2013.01); *H04L 27/2634* (2013.01)

(58) Field of Classification Search
CPC ... H04B 10/6165; H04B 10/40; H04L 1/0045; H04L 7/0075; H04L 25/03019; H04L 25/03159; H04L 27/2662; H04L 27/2697; H04L 27/2634
USPC .......................................................... 398/208
See application file for complete search history.

(56) References Cited

U.S. PATENT DOCUMENTS

| | | | |
|---|---|---|---|
| 7,693,214 B2 | 4/2010 | Shida | |
| 7,894,728 B1 | 2/2011 | Sun et al. | |
| 8,244,142 B2 | 8/2012 | Wagner et al. | |
| 8,565,621 B2 | 10/2013 | Ibragimov et al. | |
| 8,634,726 B2 | 1/2014 | Zhang et al. | |
| 8,655,191 B2 | 2/2014 | Kaneda et al. | |
| 8,687,974 B2 | 4/2014 | Zelensky et al. | |
| 8,712,247 B2 | 4/2014 | Hauske | |
| 8,731,413 B1 | 5/2014 | Dave et al. | |
| 8,873,358 B2 | 10/2014 | Saito et al. | |
| 10,110,319 B1* | 10/2018 | Hueda | H04B 10/6162 |
| 10,476,603 B2* | 11/2019 | Hueda | H04B 10/616 |
| 2006/0013590 A1 | 1/2006 | Hueda et al. | |
| 2007/0206963 A1 | 9/2007 | Koc | |
| 2008/0175590 A1 | 7/2008 | Perkins et al. | |
| 2009/0252497 A1 | 10/2009 | Younce et al. | |
| 2010/0329677 A1 | 12/2010 | Kaneda et al. | |
| 2011/0064421 A1 | 3/2011 | Zhang et al. | |
| 2011/0150506 A1 | 6/2011 | Tanimura et al. | |
| 2011/0229127 A1 | 9/2011 | Sakamoto et al. | |
| 2011/0268459 A1* | 11/2011 | Rollins | H04J 14/06 398/208 |
| 2012/0096061 A1 | 4/2012 | Hauske | |
| 2012/0177156 A1 | 7/2012 | Hauske et al. | |
| 2012/0213510 A1 | 8/2012 | Stojanovic | |
| 2012/0219302 A1 | 8/2012 | Sun et al. | |
| 2012/0257652 A1 | 10/2012 | Malipatil et al. | |
| 2012/0269513 A1 | 10/2012 | Abe | |
| 2012/0288275 A1 | 11/2012 | Zhang et al. | |
| 2012/0308234 A1* | 12/2012 | Bianciotto | H04B 10/6165 398/65 |
| 2013/0039665 A1 | 2/2013 | Hauske | |
| 2013/0084080 A1 | 4/2013 | Shibutani | |
| 2013/0209089 A1* | 8/2013 | Harley | H04B 10/5561 398/25 |
| 2013/0243127 A1 | 9/2013 | Chmelar et al. | |
| 2013/0251082 A1 | 9/2013 | Abe | |
| 2013/0259490 A1 | 10/2013 | Malouin et al. | |
| 2013/0336647 A1 | 12/2013 | Le Taillandier De Gabory et al. | |
| 2013/0343490 A1 | 12/2013 | Wertz et al. | |
| 2014/0161470 A1 | 6/2014 | Zelensky et al. | |
| 2014/0254644 A1 | 9/2014 | Gotman et al. | |
| 2014/0363176 A1* | 12/2014 | Mizuguchi | H04B 10/65 398/204 |

OTHER PUBLICATIONS

Andrew J. Viterbi et al., "Nonlinear Estimation of PSK-Modulated Carrier Phase with Application to Burst Digital Transmission", IEEE Transactions on Information Theory, Jul. 1983, pp. 543-551, vol. 29, No. 4, IEEE.

David G. Messerschmitt, "Frequency Detectors for PLL Acquisition in Timing and Carrier Recovery", IEEE Transactions on Communications, Sep. 1979, p. 1288-1295, vol. COM-27, No. 9, IEEE.

Diego E. Crivelli et al., "Adaptive Digital Equalization in the Presence of Chromatic Dispersion, PMD, and Phase Noise in Coherent Fiber Optic Systems", IEEE 2004 Global Telecommunications Conference, Nov. 29-Dec. 3, 2004, p. 2545-2551, vol. 4, IEEE.

Fabian N. Hauske et al., "Optical Performance Monitoring in Digital Coherent Receivers", Journal of Lightwave Technology, Aug. 15, 2009, pp. 3623-3631, vol. 27, No. 16, IEEE.

H. Zhang et al., "Cycle Slip Mitigation in POLMUX-QPSK Modulation", Optical Fiber Communication Conference and Exposition (OFC/NFOEC), 2011 and the National Fiber Optic Engineers Conference, Mar. 2011, pp. 1-3, Optical Society of America.

J. C. Geyer et al., "Optical Performance Monitoring using a 43Gb/s Realtime Coherent Receiver (Invited)", 2009, pp. 93-94, IEEE.

J.C. Geyer et al., "Performance Monitoring Using Coherent Receivers", 2009, pp. 1-3, IEEE.

L. E. Nelson et al., "Performance of 46-Gbps Dual-Polarization QPSK Transceiver With Real-Time Coherent Equalization Over High PMD Fiber", Journal of Lightwave Technology, Feb. 1, 2009, p. 158-167, vol. 27, No. 3, IEEE.

M. Kuschnerov et al., "DSP for Coherent Single-Carrier Receivers", Journal of Lightwave Technology, Aug. 15, 2009, p. 3614-3622, vol. 27, No. 16, IEEE.

Manar El-Chammas et al., "A 12-GS/s 81-mW 5-bit Time-Interleaved Flash ADC With Background Timing Skew Calibration", IEEE Journal Solid-State Circuits, Apr. 2011, pp. 838-847, vol. 46, No. 4, IEEE.

Oscar Agazzi et al., "Timing Recovery in Digital Subscriber Loops," IEEE Transactions on Communications, Jun. 1985, p. 558-569, vol. COM-33, No. 6, IEEE.

Oscar E. Agazzi et al., "Maximum-Likelihood Sequence Estimation in Dispersive Optical Channels", Journal of Lightwave Technology, Feb. 2005, pp. 749-763, vol. 23, No. 2, IEEE.

Shaoliang Zhang et al., "Pilot-Assisted Decision-Aided Maximum-Likelihood Phase Estimation in Coherent Optical Phase-Modulated Systems with Nonlinear Phase Noise", IEEE Photonics Technology Letters, Mar. 15, 2010, pp. 380-382, vol. 22, No. 6, IEEE.

Timo Pfau et al., "Hardware-Efficient Coherent Digital Receiver Concept with Feedforward Carrier Recovery for M-QAM Constellations", Journal of Lightwave Technology, Apr. 15, 2009, pp. 989-999, vol. 27, No. 8, IEEE.

Un-Ku Moon et al., "Timing Recovery in CMOS using Nonlinear Spectral-line Method", IEEE 1996 Custom Integrated Circuits Conference, 1996, pp. 13-16, IEEE.

Xiaofu Wu et al., "Iterative Carrier Recovery in Turbo Receivers with Distributed Pilots", IEEE International Conference on Consumer Electronics, Communications and Networks (CECNet), Apr. 2011, pp. 5024-5026, IEEE.

(56) References Cited

OTHER PUBLICATIONS

Yuriy M Greshishchev et al., "A 40GS/s 6b ADC in 65nm CMOS", IEEE International Solid-State Circuits Conference, Feb. 10, 2010, pp. 390-392, IEEE.

* cited by examiner

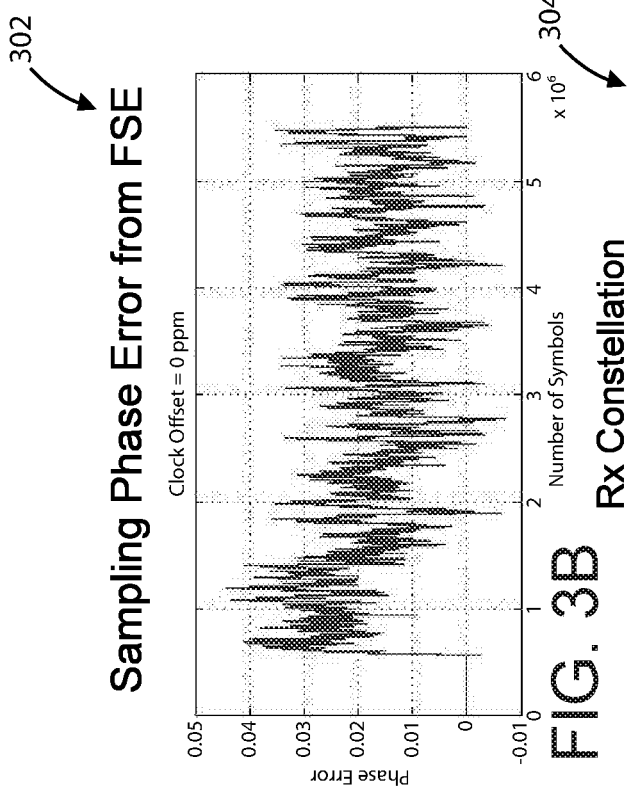
FIG. 3A
FIG. 3B
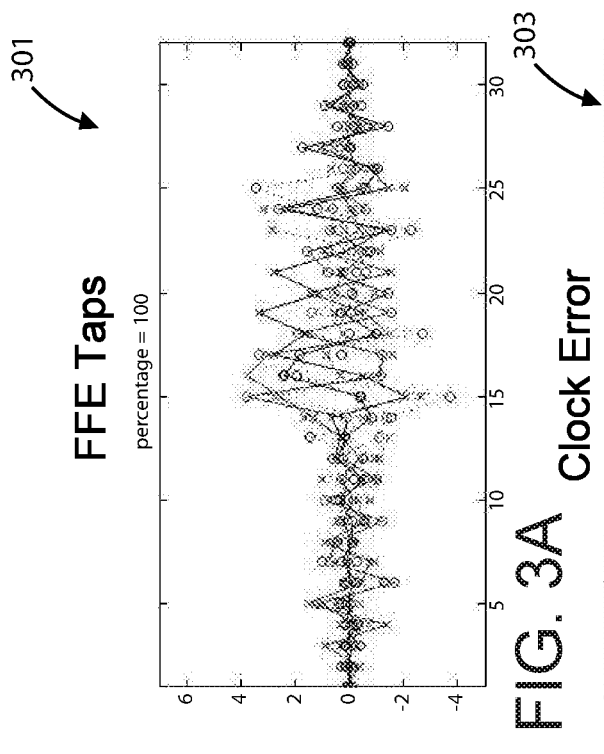
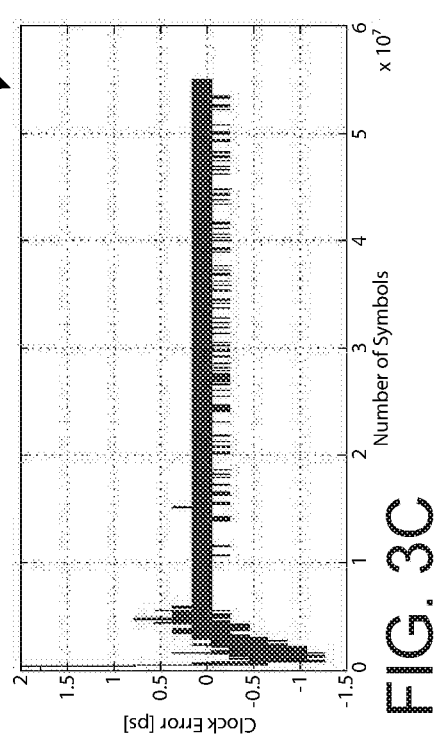
FIG. 3C
FIG. 3D

TAP STABILIZER METHOD AND STRUCTURE FOR COHERENT OPTICAL RECEIVER

CROSS-REFERENCES TO RELATED APPLICATIONS

The present application claims priority to and is a continuation of U.S. application Ser. No. 16/134,722, filed Sep. 18, 2018, which is a continuation of U.S. application Ser. No. 15/792,396, filed Oct. 24, 2017, now issued as U.S. Pat. No. 10,110,319 on Oct. 23, 2018, which claims priority to an incorporates by reference, for all purposes, the following U.S. provisional patent applications: U.S. Provisional App. No. 62/412,052, filed on Oct. 24, 2016; U.S. Provisional App. No. 62/412,071, filed on Oct. 24, 2016; U.S. Provisional App. No. 62/412,033, filed on Oct. 24, 2016; U.S. Provisional App. No. 62/412,047, filed on Oct. 24, 2016; U.S. Provisional App. No. 62/412,015, filed on Oct. 24, 2016; U.S. Provisional App. No. 62/412,002, filed on Oct. 24, 2016; and U.S. Provisional App. No. 62/412,039, filed on Oct. 24, 2016. The present application also incorporates by reference, for all purposes, the following U.S. Patents: U.S. Pat. No. 9,337,934, filed on Nov. 29, 2013, and issued on May 10, 2016; U.S. Pat. No. 9,178,625, filed on Dec. 3, 2013, and issued on Nov. 3, 2015; and U.S. Pat. No. 9,077,572, filed on Jan. 17, 2013, and issued on Jul. 7, 2015.

BACKGROUND OF THE INVENTION

The present invention relates to communication systems and integrated circuit (IC) devices. More particularly, the present invention provides for improved methods and devices for optical communication.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Optical communication is one major technological area that is growing to address these high demands on data. Optical communication systems typically communicate data over a plurality of channels corresponding to different phases and/or polarizations of the optical signal. While the data communicated over the different channels is typically aligned relative to a common clock when transmitted by the transmitter, delay (or skew) may be introduced into one or more of the channels based on characteristics of the transmitter, receiver, and/or the optical fiber. As a result, the relative timing of the data in the various channels may be misaligned at the receiver, causing degradation of the recovered data.

Although there are several types of devices and methods related to optical communication systems, they have been inadequate for the advancement of various applications. Conventional embodiments consume large areas or large amounts of power and suffer from performance limitations. Therefore, improved devices and methods for optical communication systems and related electronics are highly desired.

BRIEF SUMMARY OF THE INVENTION

The present invention relates to communication systems and integrated circuit (IC) devices. More particularly, the present invention provides for improved methods and devices for optical communication.

The present invention provides for the TR operation after channel dispersion compensation blocks (e.g., for chromatic dispersion (CD) and polarization mode dispersion (PMD)). This architecture provides both improves performance and reduces power consumption of the receiver device. Performance is improved because channel impairments (e.g., high order PMD, residual CD, very low excess bandwidth, etc.) do not impact the TR operation. The latency of the TR loop is not affected since the feed-forward equalization (FFE) equalizer is not included within the TR loop. Power consumption is reduced because the use of the FFE immediately after the bulk chromatic dispersion (BCD) equalizer, which enables residual CD and PMD to be jointly compensated in only one frequency-domain (FD) equalizer. Using a frequency domain block least-means-square (LMS) adaptation reduces the complexity of the device architecture. Further, baud rate timing recovery algorithms, such as Muller and Mueller (M&M) can be adopted. Thus, in an example, the present invention adopts an asynchronous FD adaptive equalizer to implement timing recovery with equalized signals, and to reduce implementation complexity.

In various examples, the present invention provides for a method and structure for a coherent optical receiver device. The device can include an input signal; a first fast Fourier transform (FFT) module receiving the input signal, the first FFT module being configured to compute a first discrete Fourier transform (DFT) of the input signal; a chromatic dispersion (CD) equalizer module coupled to the first FFT module, the CD equalizer module being configured to compensate for CD affecting the input signal; a polarization mode dispersion (PMD) equalizer module coupled to the CD equalizer and a least means square (LMS) module, the PMD equalizer module being configured to compensate for PMD affecting the input signal following compensation by the CD equalizer module. The PMD equalizer module includes a plurality of PMD taps. In a specific example, the CD equalizer module includes a non-adaptive frequency-domain (FD) equalizer, and the PMD equalizer module includes an adaptive FD equalizer. Further, the input can be a dual polarization input with an x-type and y-type inputs.

In an example, the device can also include an inverse FFT (IFFT) module coupled to the PMD equalizer module, the IFFT module being configured to compute an inverse DFT of the input signal; an interpolated timing recovery (ITR), slicer, and error evaluation module coupled to the IFFT module. The ITR, slicer, and the error evaluation can be separate modules, the ITR module being configured to retime the input signal, the slicer module being configured to derive the data stream, and the error evaluation module being configured to retime the input signal.

In an example, the device can include a zero padding module coupled to the slicer and error evaluation module, the zero padding module being configured to increase a sampling rate of the input signal; and a second FFT module coupled to the zero padding module, the second FFT module being configured to compute a second DFT of the input signal. In an example, the LMS module is coupled to the second FFT module, the CD equalizer module, and the PMD equalizer module. The LMS module outputs to the PMD equalizer module and is configured to filter the input signal.

In an example, the PMD equalizer is coupled to an ITR module. In a specific example, the IFFT module is configured between the PMD equalizer module and the ITR module. An error evaluation or error computation module is coupled to the ITR module. The error evaluation module can be configured to compute a first sampling phase error (SPE). The device also includes a timing phase information (TPI) module, a combining module, and a timing recovery (TR) filter. The TPI module can be coupled to the PMD equalizer module or to an IFFT module that is coupled to the PMD equalizer module (as described for the ITR module). The TPI module can be configured to compute a second SPE from the plurality of PMD taps from the PMD equalizer module. Then, the combining module can combine the first SPE and the second SPE into a total phase error (TPE). The TR filter can filter the TPE to be used by the ITR module to synchronize the input signal.

The method includes computing, by the error evaluation module, a first sampling phase error (SPE) and computing, by a timing phase information (TPI) module, a second SPE from a plurality of chromatic dispersion (CD) equalizer taps and polarization mode (PMD) equalizer taps. The first and second SPE are combined into a total phase error (TPE) in a combining module, and the resulting TPE is filtered by the TR filter coupled to an ITR module and the combining module. The ITR module then synchronizes an input signal of the coherent optical receiver according to the TPE. Those of ordinary skill in the art will recognize other variations, modifications, and alternatives.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention the presently described embodiments and the presently understood best mode of the invention are described with additional detail through the use of the accompanying drawings in which:

FIG. 3A-3D are simplified graphs illustrating simulations for a coherent optical receiver according to conventional example.

DETAILED DESCRIPTION OF THE INVENTION

Figure 1:
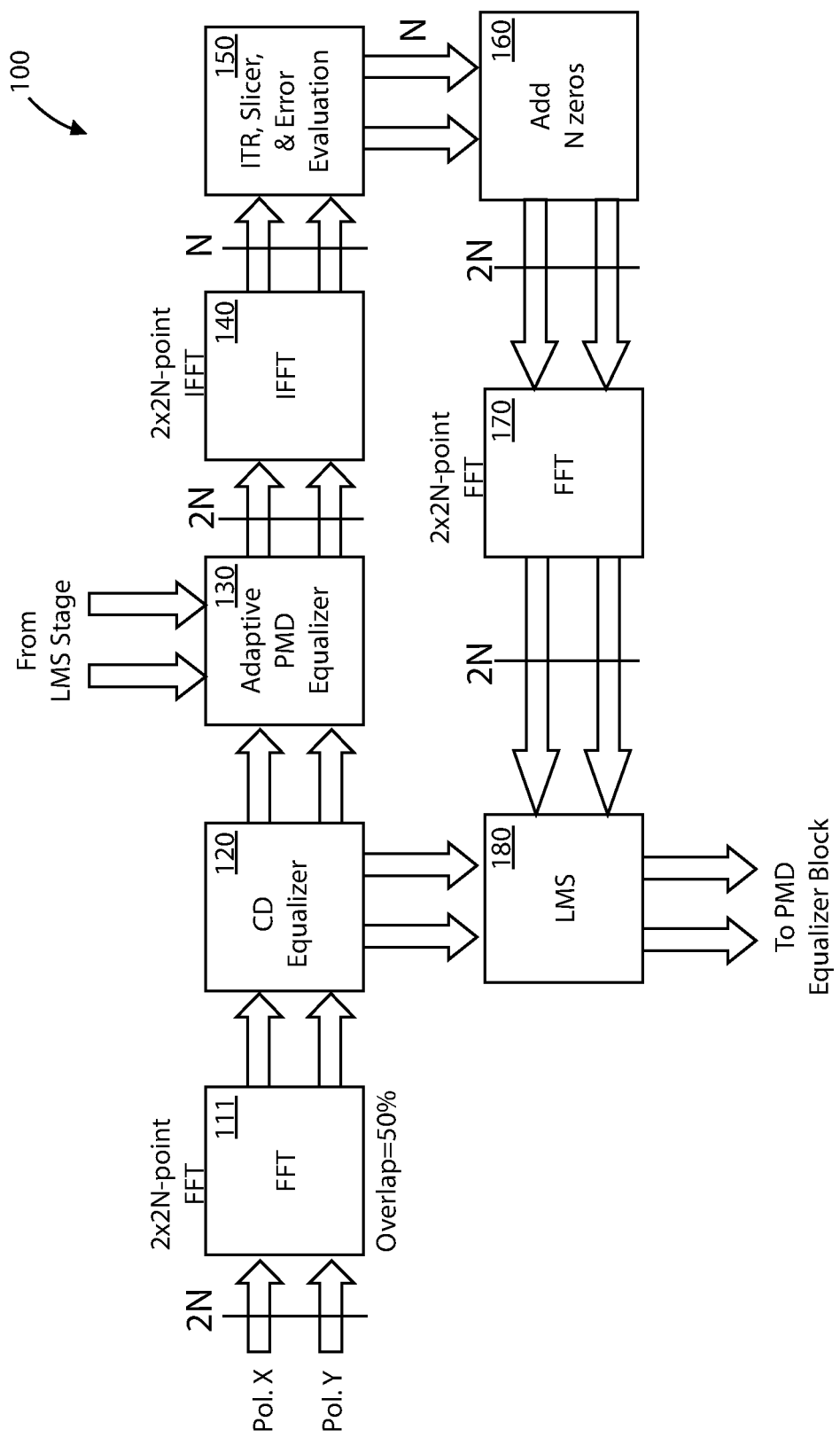
FIG. 1 is a simplified diagram illustrating a block diagram of a coherent optical receiver according to an example of the present invention.

The present invention relates to communication systems and integrated circuit (IC) devices. More particularly, the present invention provides for improved methods and devices for optical communication.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Clock timing recovery (TR) critical for data communications, and optical data communications are no exception. Certain conventional devices implement timing recovery operations with intersymbol interference (ISI)-free samples. However, there is an interaction problem between timing synchronization and equalization in coherent optical applications. A high higher of multiplications and oversampling is required by squared or fourth-power based TR algorithms, which leads to increased power consumption. Examples of the present invention address this problem with a receiver architecture based on asynchronous frequency domain equalization.

In an example, the present invention provides for the TR operation after channel dispersion compensation blocks (e.g., for chromatic dispersion (CD) and polarization mode dispersion (PMD)). This architecture provides both improves performance and reduces power consumption of the receiver device. Performance is improved because channel impairments (e.g., high order PMD, residual CD, very low excess bandwidth, etc.) do not impact the TR operation. The latency of the TR loop is not affected since the feedforward equalization (FFE) equalizer is not included within the TR loop. Power consumption is reduced because the use of the FFE immediately after the bulk chromatic dispersion (BCD) equalizer, which enables residual CD and PMD to be jointly compensated in only one frequency-domain (FD) equalizer. Using a frequency domain block least-means-square (LMS) adaptation reduces the complexity of the device architecture. Further, baud rate timing recovery algorithms, such as Muller and Mueller (M&M) can be adopted. Thus, in an example, the present invention adopts an asynchronous FD adaptive equalizer to implement timing recovery with equalized signals, and to reduce implementation complexity.

FIG. 1 is a simplified diagram illustrating a block diagram of a coherent optical receiver according to an example of the present invention. As shown, device 100 can include an input signal; a first fast Fourier transform (FFT) module receiving the input signal, the first FFT module 111 being configured to compute a first discrete Fourier transform (DFT) of the input signal; a chromatic dispersion (CD) equalizer module 120 coupled to the first FFT module 111, the CD equalizer module 120 being configured to compensate for CD affecting the input signal; a polarization mode dispersion (PMD) equalizer module 130 coupled to the CD equalizer and a least means square (LMS) module 180, the PMD equalizer module 130 being configured to compensate for PMD affecting the input signal following compensation by the CD equalizer module. The PMD equalizer module 130 includes a plurality of PMD taps. In a specific example, the CD equalizer module includes a non-adaptive frequency-domain (FD) equalizer, and the PMD equalizer module includes an adaptive FD equalizer. Further, the input can be a dual polarization input with an x-type and y-type inputs.

In an example, the device can also include an inverse FFT (IFFT) module 140 coupled to the PMD equalizer module 130, the IFFT module being configured to compute an inverse DFT of the input signal; an interpolated timing recovery (ITR), slicer, and error evaluation module 150 coupled to the IFFT module 140. The ITR, slicer, and the error evaluation can be separate modules, the ITR module being configured to retime the input signal, the slicer module being configured to derive the data stream, and the error evaluation module being configured to retime the input signal. Further details are provided in reference to FIG. 2.

In an example, the device can include a zero padding module 160 coupled to the slicer and error evaluation module 150, the zero padding module 160 being configured to increase a sampling rate of the input signal; and a second FFT module 170 coupled to the zero padding module 160, the second FFT module 170 being configured to compute a second DFT of the input signal. In an example, the LMS module 180 is coupled to the second FFT module 170, the CD equalizer module 120, and the PMD equalizer module 130. The LMS module 180 outputs to the PMD equalizer module 130 and is configured to filter the input signal. Those of ordinary skill in the art will recognize other variations, modifications, and alternatives.

The reduction of complexity results from not having to use separate FD BCD and FFE equalizers. As shown in FIG. 1, only one (dual polarization) FFT and only one (dual polarization) IFFT are required in the signal path. An architecture using separate FD blocks for the BCD and FFE requires extra FFTs and IFFTs as a result of going back and forth from the frequency domain to the time domain. Further, the LMD update can be viewed as computing a correlation between the input signal and the error. Here, this correlation is computed in the frequency domain, which reduces complexity the same way as in convolution computations.

With this architecture, an interaction problem arises when TR is achieved after the adaptive equalizer (i.e., PMD equalizer). This problem occurs because the adaptation algorithm of the equalizer and the timing-synchronizer use the same (equalized) signal as their input. The equalizer tries to compensate the misadjustment of the discrete time impulse response due to the sampling phase error, while the TR tries to equalize the distortion of the impulse response by changing the sampling phase. As a consequence, the timing phase and the equalizer taps are drifting. Conventional solutions to this problem have severe drawbacks in (time variant) coherent optical channels. Making the timing loop much faster than the equalizer can mitigate this interaction problem, but the timing phase may still drift slowly over long periods of time.

According to an example of the present invention, a constrained adaptive algorithm can be used to reduce or eliminate strong interaction between the adaptive equalizer and the timing recovery loop. Constraining multiple equalizer taps can be done if the adaptive filter is known to have a certain characteristic (e.g., linear phase implies tap symmetry). A constrained adaptive algorithm can also be applied in which the magnitude and the phase responses of the adaptive equalizer remain unchanged at a given frequency. Timing phase information (TPI) contained within the equalizer taps can also be fed into the timing recovery loop as a factor for computing sampling phase error.

Figure 2:
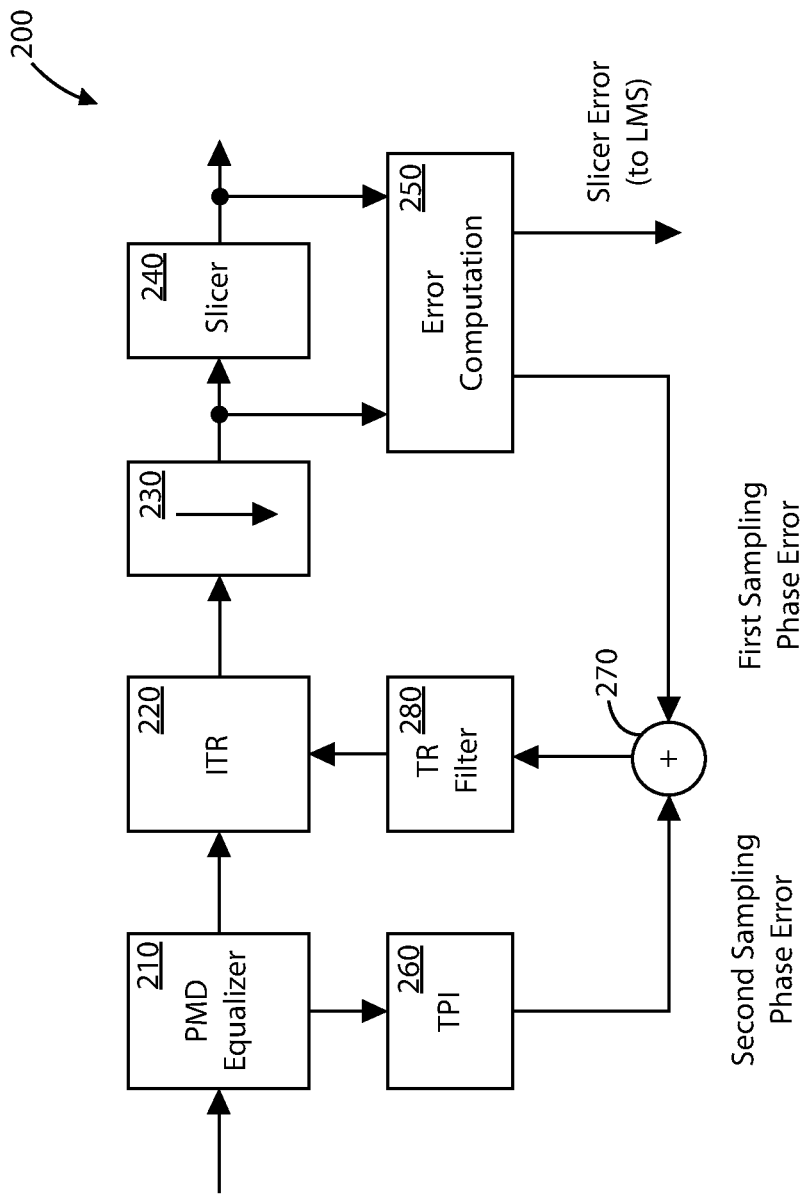
FIG. 2 is a simplified diagram illustrating a block diagram of a portion of a coherent optical receiver according to an example of the present invention.

FIG. 2 is a simplified diagram illustrating a block diagram of a portion of a coherent optical receiver according to an example of the present invention. As shown, device 20 includes a PMD equalizer module 210, which is similar to the PMD equalizer module 130 of FIG. 1. This PMD equalizer is coupled to an ITR module 220. In a specific example, an IFFT module (such as IFFT module 140 of FIG. 1) is configured between the PMD equalizer module 210 and the ITR module 220. The ITR module is configured to synchronize the input signal according to a tap stabilizing algorithm.

Let c be the impulse response of the equalizer and $\tau_n$ be the timing error. Assuming that the timing error is small, the equalizer impulse response in the presence of timing error can be expressed as a linear function of the timing error $\tau_n$ as follows:

$$c(E(\tau_n)) = s_c E(\tau_n) + C_{\tau=0}$$

where $s_c$ is the vector of the slope of the equalizer coefficients and $E(\tau_n)$ comes from the averaging of the equalizer loop.

Since the TR loop is achieved after the adaptive equalizer, its timing function will be modified as a result of the variation of the equalizer coefficients. If $c_{\tau=0}$ is available, it is possible to extract the mean timing error by adding a new timing-error signal obtained from the equalizer taps as follows:

$$s_c E(\tau_n) = c(E(\tau_n)) - c_{\tau=0}$$

This approach requires a priori knowledge of the particular equalizer coefficients at an optical timing phase ($c_{\tau=0}$).

In an example, the present tap stabilizer algorithm can be used to obtain sampling phase information based on the response of an multiple input multiple output (MIMO) FFE. The algorithm can use the Jones matrix because it is unitary, its determinant is independent of the fiber impairments (i.e., DGD, second order PMD (SOPMD)), and contains information of the timing error. This scheme is able to provide reliable information even in the presence of highly dispersive channels. Furthermore, this scheme is able to work with any roll-off factor and can be applied to blind adaptation procedures.

The channel transfer matrix at the FFE input can be written as follows:

$$H(\omega)=G(\omega)J(\omega)$$

where the scalar linear factor $G(\omega)$ represents the total response of the transmit pulse, residual CD, and receive pulse, while $J(\omega)$ is the PMD Jones unitary matrix (i.e., $\det\{J(\omega)\}=1$) given by the following:

$$J(\omega) = \begin{bmatrix} U(\omega) & V(\omega) \\ -V^*(\omega) & U^*(\omega) \end{bmatrix}$$

The determinant of the channel transfer matrix is as follows:

$$\det\{H(\omega)\}=G^2(\omega)\det\{J(\omega)\}=G^2(\omega)$$

Here, the determinant is not affected by the PMD.

Let $F(\omega)$ be the transfer matrix of the FSE given by the following:

$$F(\omega) = \begin{bmatrix} F_{11}(\omega) & F_{12}(\omega) \\ F_{21}(\omega) & F_{22}(\omega) \end{bmatrix}$$

From the above, $F(\omega)$ can be rewritten as follows:

$$F(\omega)=P(\omega)J^H(\omega)$$

where $P(\omega)$ is a scalar linear factor that depends on $G(\omega)$ (and possibly the noise power for minimum mean-square error (MMSE) criteria), while the superscript "H" denotes transpose and conjugate.

The determinant of the equalizer transfer matrix is as follows:

$$\det\{F(\omega)\}=P^2(\omega)\det\{J^H(\omega)\}=P^2(\omega)$$

Here, the determinant is not affected by the PMD. That is, the determinant is independent of PMD variation such as polarization rotation.

Let $J(\omega_0, t)$ and $F(\omega_0, t)=P(\omega_0)J^H(\omega_0, t)$ be the PMD matrix and the FSE transfer matrix at a given frequency $\omega_0$ and instant t, respectively. For simplicity, the CD parameter is assumed to not change with time (i.e., $P(\omega_0, t)=P(\omega_0)$). The determinant can be defined as follows:

$$S(\omega_0,t)=\det\{F(\omega_0,t)\}=P^2(\omega_0)$$

Here, $S(\omega_0, t)$ is independent of PMD time variations.

Let $F(\omega_0, 0)$ be the transfer matrix at instant t=0. In the presence of a clock offset $\Delta T$, the transfer matrix at instant t is as follows:

$$F(\omega_0,t)=e^{-j\omega_0\tau}P(\omega_0)J^H(\omega_0,t)$$

where $\tau=\Delta T/(T+\Delta T)t<200\times10^{-6}t$, with T being the symbol period.

From the above, $S(\omega_0, t)$ is as follows:

$$S(\omega_0,t)=e^{-j2\omega_0\tau}S(\omega_0,0)$$

from which the determinant contains information of the sampling phase error.

Denoting $|S(\omega_0, t)|=K$ and taking into account the following:

$$S(\omega_0,t)=e^{-j2\omega_0\tau}S(\omega_0,0)$$

Note that $\rho(\omega_0, t)$ is as follow:

$$\rho(\omega_0,t)=S(\omega_0,t)S^*(\omega_0,0)=K^2e^{-j2\omega_0\tau}$$

Then, the phase error signal can be obtained from the following:

$$\varepsilon_{fse}=-\mathrm{angle}(\rho(\omega_0,t))=2\omega_0\tau$$

The sampling phase error is derived directly from the FFE taps, therefore it can be used even during a blind adaptation procedure. The phase error as defined previously can be used directly for timing recovery. Further note that P+I TR loop will avoid any FFE tap shifting (i.e., $\tau\to 0$).

In practical receivers, independent carrier recovery for each polarization can be used at the output of the FFE. In this case, the FFE taps for each polarization can be slowly rotated with arbitrary phases, as shown by the following:

$$F(\omega_0,t)=e^{-j\omega_0\tau}e^{j\phi(t)}P(\omega_0)R(t)J^H(\omega_0,t)$$

with the following:

$$R(t) = \begin{Bmatrix} e^{\frac{\phi_x(t)-\phi_y(t)}{2}} & 0 \\ 0 & e^{\frac{-j(\phi_x(t)-\phi_y(t))}{2}} \end{Bmatrix}$$

$$\phi(t) = \frac{\phi_x(t)+\phi_y(t)}{2}$$

Here, $R(t)$ is unitary and the phase of the determinant of $F(\omega_0, 0)$ varies with the rotations of the FFE taps, shown by the following:

$$S(\omega_0,t)=e^{-j2\omega_0\tau}e^{j2\phi(t)}S(\omega_0,0)$$

Thus, the rotations of the equalizer taps impact the phase of the determinant of $F(\omega_0, 0)$; therefore, it cannot be used to provide reliable information of the sampling phase. However, in order to mitigate the impact of the taps rotation on the sampling phase estimation, $S(\omega_0, t)$ is defined as the determinant of the following matrix:

$$\begin{aligned} M_f(\omega_0, t) &= F(\omega_0, t)F^H(-\omega_0, t) \\ &= e^{-j2\omega_0\tau}|P(\omega_0)|^2 R(t)J^H(-\omega_0, t)R^H(t) \\ &= e^{-j2\omega_0\tau}|P(\omega_0)|^2 Z(\omega_0, -\omega_0, t) \end{aligned}$$

where $Z(\omega_0, -\omega_0, t)$ is a unitary matrix for all $(\omega_0, t)$.

Thus, the taps rotation does not affect the phase of the determinant, which is shown as follows:

$$S(\omega_0,t)=\det\{M_f(\omega_0,t)\}=e^{-j4\omega_0\tau}|P(\omega_0)|^4$$

Let $F(\Omega_0)$ be the transfer matrix of the discrete time FSE given by the following:

$$F(\Omega_0) = \begin{bmatrix} F_{11}(\Omega_0) & F_{12}(\Omega_0) \\ F_{21}(\Omega_0) & F_{22}(\Omega_0) \end{bmatrix}$$

where $\Omega_0$ is as follows:

$$\Omega_0 = \omega_0 \frac{T}{OS}$$

where OS is an oversampling factor.

Elements of $F(\Omega_0)$ can be evaluated as follows:

$$F_{ab}(\Omega_0) = \sum_{k=0}^{N_{FSE}-1} f_{ab}(k)e^{-jk\Omega_0}$$

where $f_{ab}(k)$, a, b∈[1,2] are the taps of the FSE and $N_{FSE}$ is the number of taps.

If $\Omega_0$ is set as follows:

$$\Omega_0 = \pm\frac{\pi}{4}$$

then the filtering process is simplified for VLSI implementation.

Returning to the device architecture 200, an error evaluation or error computation module 250 is coupled to the ITR module 220. The error evaluation module can be configured to compute a slicer error and a first sampling phase error (SPE). The slicer error can be outputted to an LMS module, similar to LMS module 180 of FIG. 1. In order to provide a proper bandwidth for the TR loop, the sampling phase information derived from the FSE taps can be combined with a baud rate synchronization technique, such as one based on the Muller and Mueller (M&M) phase error. In a specific example, the first SPE is calculated according to a baud rate synchronization technique based on a M&M phase error, which can be represented by the following equation:

$$\varepsilon_{mm} = K_{mm}\Re\left(\sum_{nN_p+2}^{(n+1)N_p} \hat{a}^*(k)q(k-1) - \hat{a}^*(k-1)q(k)\right)$$

where $K_{mm}$, is a certain gain,
where $\Re$ refers to real component of a complex number,
where $N_p$ is a parallelism factor,
where $q(k)$ is an input of slicer and error evaluation module, and
where $\hat{a}^*$ is an output of the slicer and error evaluation module.

In an example, a compression module 230 can be coupled between the ITR module 220 and the error computation module 250. The compression module 230 can be configured to compress the dual polarization input signal. Further, a slicer module 240 can be coupled to both the compression module 230 and the error computation module 250. The slicer module 240 can be configured to derive a data stream from the input signal. Those of ordinary skill in the art will recognize other variations, modifications, and alternatives.

In an example, the device 200 also includes a timing phase information (TPI) module 260, a combining module 270, and a timing recovery (TR) filter 280. The TPI module 260 can be coupled to the PMD equalizer module 210 or to an IFFT module that is coupled to the PMD equalizer module 210 (as described for the ITR module 220). The TPI module 260 can be configured to compute a second SPE from the plurality of PMD taps from the PMD equalizer module 210. Then, the combining module 270 can combine the first SPE and the second SPE into a total phase error (TPE). That is, the total phase error is $\varepsilon_t = \varepsilon_{mm} + \varepsilon_{fse}$. The TR filter 280 can filter the TPE to be used by the ITR module 220 to synchronize the input signal.

The present invention provides for device structures and methods of computing sampling phase error according to the algorithms described previously. In a specific example, the TPI module computes the second SPE according to the following equation:

$$\varepsilon_{fse} = -K_{fse}\text{angle}(\det(M_f))$$

where $K_{fse} = [2^{-1}, \ldots, 2^{-4}]$, and
where $M_f = e^{-j2\omega_0\tau}|P(\omega_0)|^2 Z(\omega_0, -\omega_0, t)$,
where $\omega_0$ is a given frequency,
where $$\tau = \frac{\Delta T}{(T+\Delta T)t} < 200 \times 10^{-6}t,$$

where $P(\omega_0)$ is a CD parameter, and
where $Z(\omega_0, -\omega_0, t)$ is a unitary matrix for all $(\omega_0, t)$.

In a specific example, the TPI module computes the second SPE according to the following equation:

$$\varepsilon_{fse} = 2\omega_0\tau$$

where $\omega_0$ is a given frequency, and
where $$\tau = \frac{\Delta T}{(T+\Delta T)t} < 200 \times 10^{-6}t,$$

where $\tau$ is a given time, and
where T is a symbol period.

In an example, the present invention provides a method of operating a coherent optical receiver device. The method can include providing an input signal; computing, by a first fast Fourier transform (FFT) module receiving the input signal, a first discrete Fourier transform (DFT) of the input signal. The method can include compensating, by a chromatic dispersion (CD) equalizer module coupled to the first FFT module, for CD affecting the input signal; and compensating, by a polarization mode dispersion (PMD) equalizer module coupled to the CD equalizer module and coupled to a least means square (LMS) module and having a plurality of PMD taps, for PMD affecting the input signal following the compensation by the CD equalizer module. Further, the method can include computing, by an inverse FFT (IFFT) module coupled to the PMD equalizer module, an inverse DFT of the input signal. In an example, the method includes filtering, by the LMS module coupled to the CD equalizer module and the second FFT module and the PMD equalizer module, the input signal.

In an example, the method includes computing a total sampling error from two sampling phase errors. More specifically, the method can include computing, by an error evaluation module coupled to the IFFT module, a first sampling phase error (SPE); and computing, by a timing phase information (TPI) module coupled to the error evaluation module and the IFFT module, a second SPE from the plurality of PMD taps. Then, the method includes combining, by a combining module coupled to the TPI module and the error evaluation module, the first and second SPE into a total phase error (TPE). Further, the method includes filtering, by a timing recovery (TR) filter coupled to an interpolated timing recovery (ITR) module and the combining module, the TPE. With the filtered TPE, the method includes synchronizing, by the ITR module, the input signal according to the TPE. Outside of the TR loop, the method includes computing, by a second FFT module coupled to the error evaluation module, a second DFT of the input signal, which is fed to the LMS module.

FIG. 3A-3D are simplified graphs illustrating simulations for a coherent optical receiver according to conventional example. As shown, graphs 301-304 illustrate a first test case applying the constrained adaptive algorithm or tap stabilizer algorithm. Here, the LMS step-size is $2^{-11}$ and the clock offset is 0 ppm. FIG. 3A (graph 301) shows the signals at the FFE taps (i.e., PMD equalizer taps). FIG. 3B (graph 302) shows the sampling phase error computed from the PMD equalizer taps. FIG. 3C (graph 303) shows the clock error and FIG. 3D (304) shows an Rx constellation.

Figure 4A:
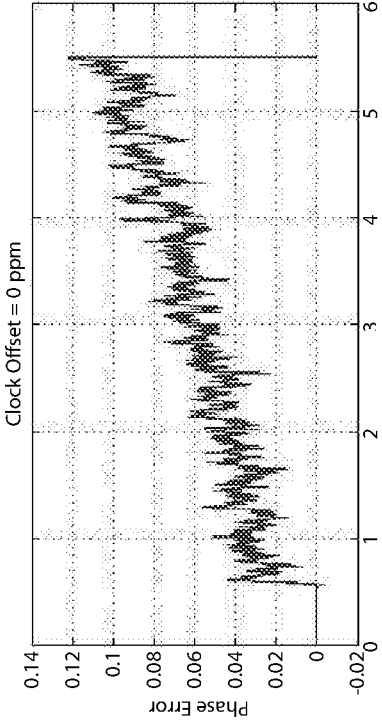
FIG. 4A-4D are simplified graphs illustrating simulations for a coherent optical receive according to an example of the present invention.
Figure 4B:
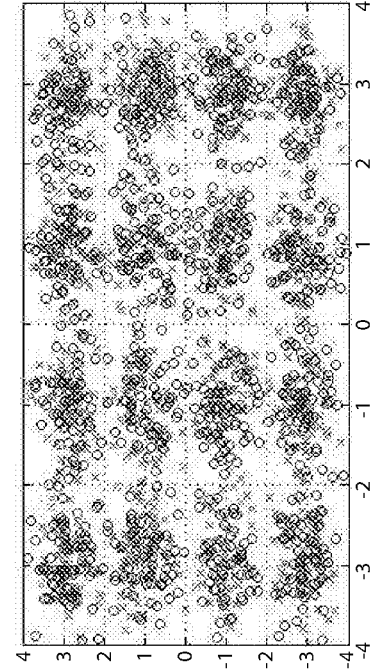
Figure 4C:
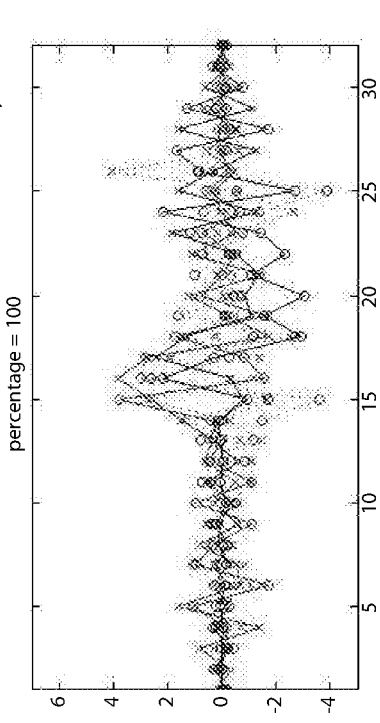
Figure 4D:
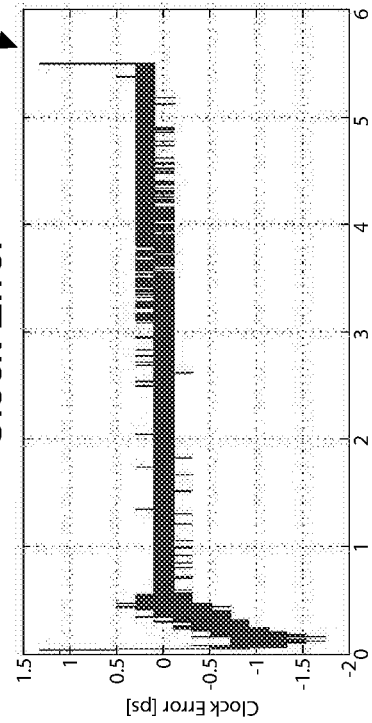

FIG. 4A-4D are simplified graphs illustrating simulations for a coherent optical receive according to an example of the present invention. As shown, graphs 401-404 illustrate a second test case with an unconstrained adaptive algorithm (i.e., without the tap stabilizer algorithm). The LMS step-size and clock offset are the same as for FIGS. 3A-3D (i.e., $2^{-11}$ and 0 ppm, respectively). Similarly, FIG. 4A (graph 401) shows the signals at the FFE taps equalizer taps. FIG. 4B (graph 402) shows the sampling phase error computed from the PMD equalizer taps. FIG. 4C (graph 403) shows the clock error and FIG. 4D (404) shows an Rx constellation. Compared to the case of FIGS. 3A-3D, this case does not estimate the sampling phase error as accurately.

Figure 5A:
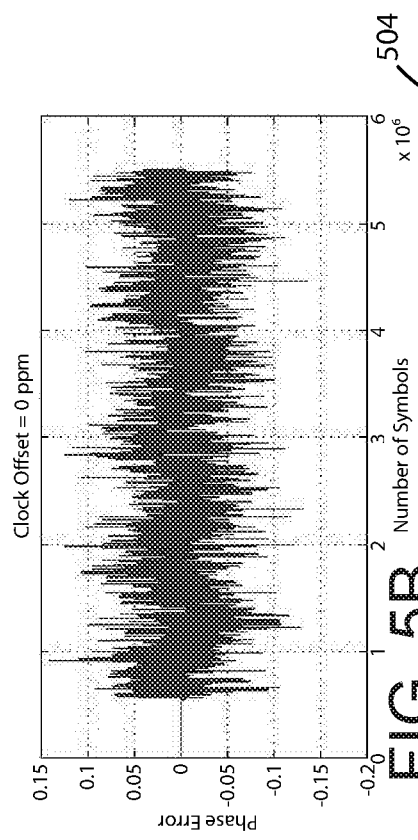
FIG. 5A-5D are simplified graphs illustrating simulations for a coherent optical receiver according to conventional example.
Figure 5B:
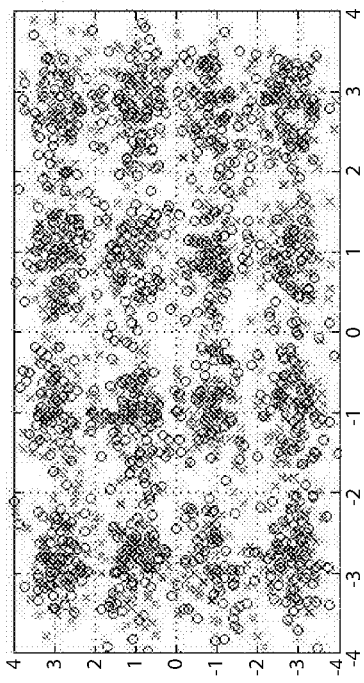
Figure 5C:
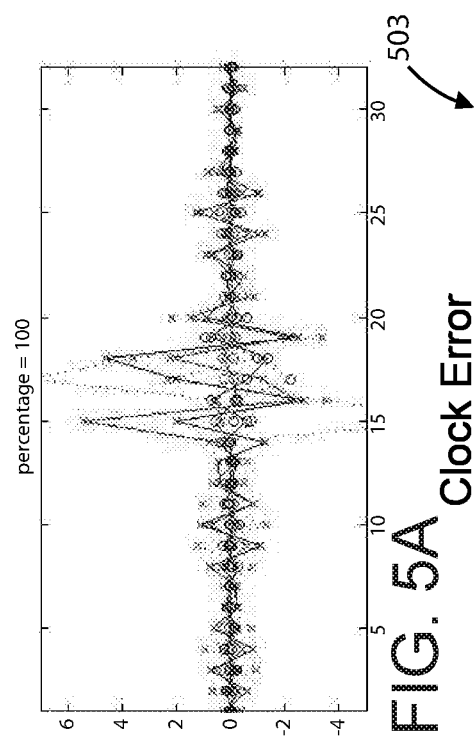
Figure 5D:
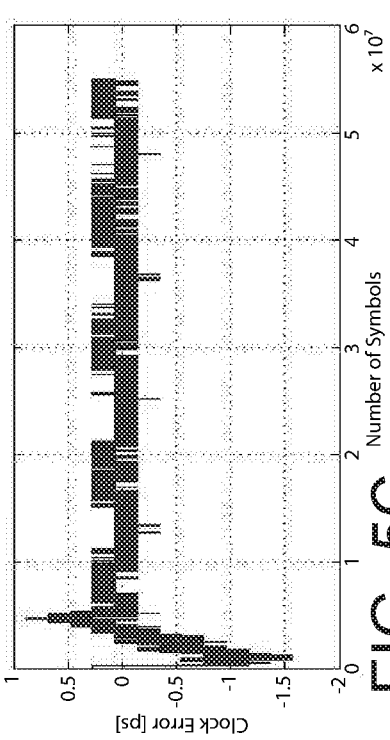

FIG. 5A-5D are simplified graphs illustrating simulations for a coherent optical receiver according to conventional example. As shown, graphs 501-504 illustrate a third test case applying the tap stabilizer algorithm with a time variant differential-group-delay (DGD). Here, the LMS step-size is $2^{-8}$ and the channel is characterized by DGD=T/2→Rot. KHz→DGD=T/2. FIG. 5A (graph 501) shows the signals at the FFE taps (i.e., PMD equalizer taps). FIG. 5B (graph 502) shows the sampling phase error computed from the PMD equalizer taps. FIG. 5C (graph 503) shows the clock error and FIG. 5D (504) shows an Rx constellation.

Figure 6A:
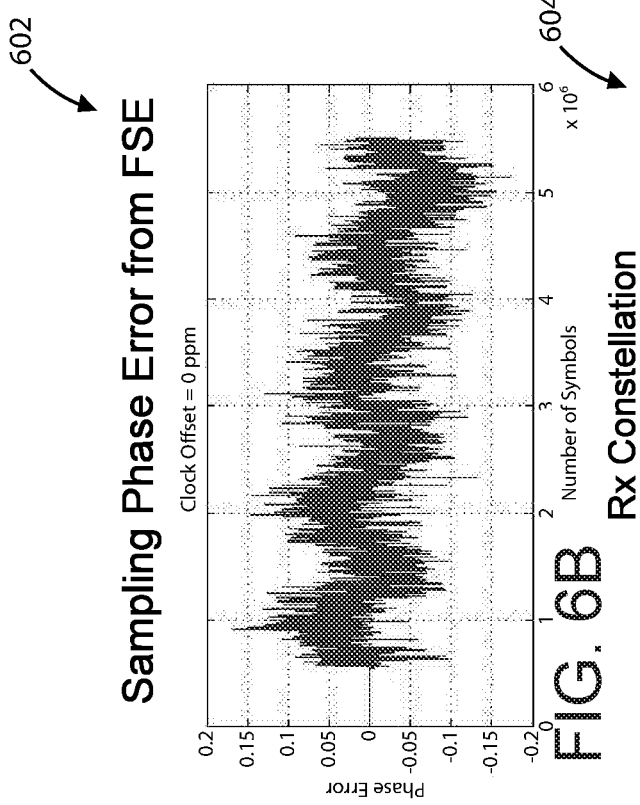
FIG. 6A-6D are simplified graphs illustrating simulations for a coherent optical receive according to an example of the present invention.
Figure 6B:
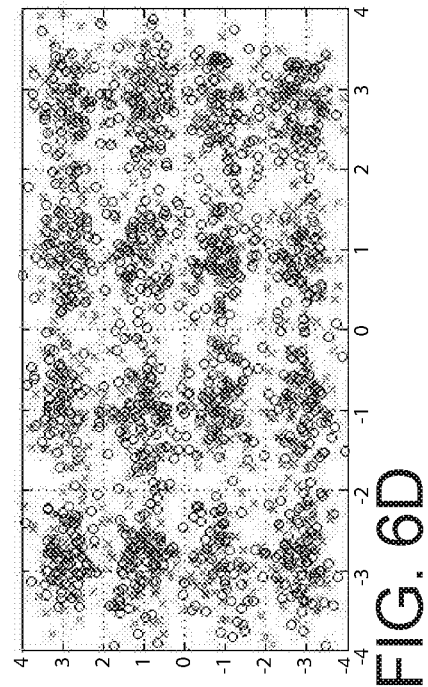
Figure 6C:
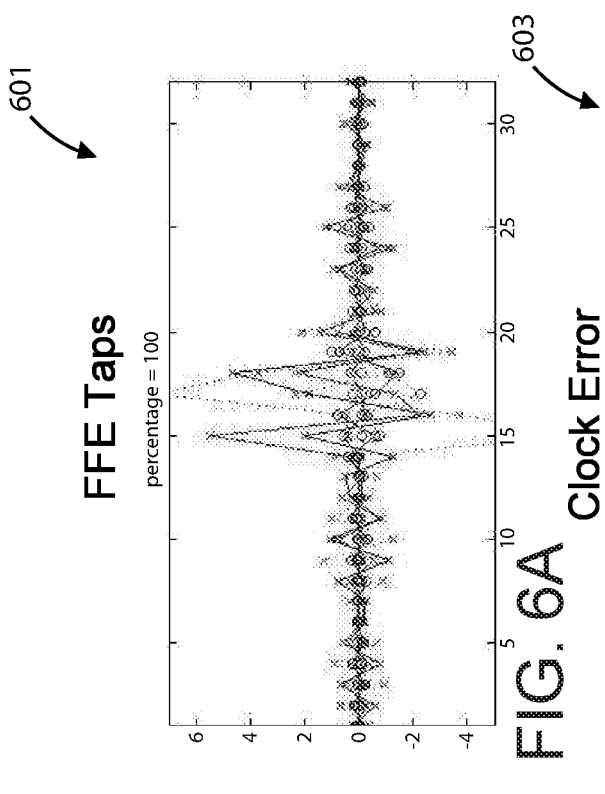
Figure 6D:
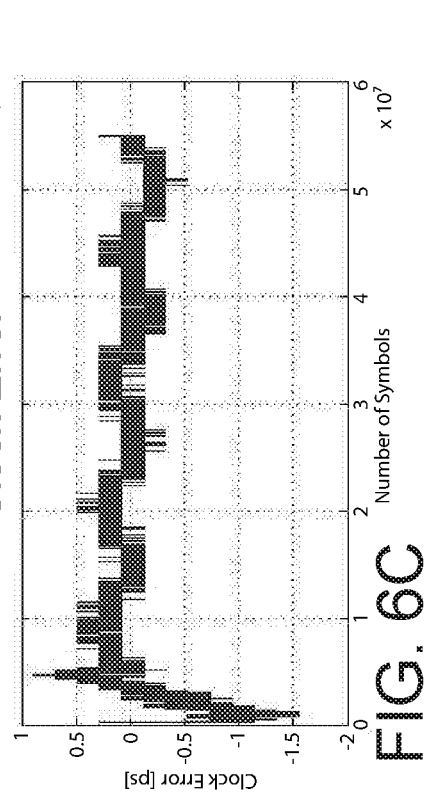

FIG. 6A-6D are simplified graphs illustrating simulations for a coherent optical receive according to an example of the present invention. As shown, graphs 601-604 illustrate a fourth test case with without the tap stabilizer algorithm with a time variant DGD. The LMS step-size and channel characterization are the same as for FIGS. 5A-5D (i.e., $2^{-8}$ and DGD=T/2→Rot. KHz→DGD=T/2, respectively). Similarly, FIG. 6A (graph 401) shows the signals at the FFE taps equalizer taps. FIG. 6B (graph 602) shows the sampling phase error computed from the PMD equalizer taps. FIG. 6C (graph 603) shows the clock error and FIG. 6D (604) shows an Rx constellation. Compared to the case of FIGS. 5A-5D, this case does not estimate the sampling phase error as accurately.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A coherent optical receiver device, the device comprising:
   a compensation module configured to receive an input signal, the compensation module having a plurality of taps;
   an evaluation module coupled to the compensation module, the evaluation module being configured to compute a first sampling phase error (SPE) from the input signal;
   a timing phase information (TPI) module coupled to the compensation module, the TPI module being configured to compute a second SPE from the plurality of taps; and
   a combining module coupled to the evaluation module and the TPI module, the combining module-being configured to combine the first and second SPE into a total phase error (TPE).

2. The device of claim 1 wherein the input signal is a dual-polarization input with an x-type polarization input and a y-type polarization input.

3. The device of claim 1 wherein the compensation module includes a non-adaptive frequency-domain (FD) equalizer, an adaptive FD equalizer, or both.

4. The device of claim 1 wherein the first SPE is computed according to a baud rate synchronization technique based on a Muller and Mueller phase error.

5. The device of claim 1 wherein the evaluation module includes a slicer module configured to derive a data stream from the input signal.

6. The device of claim 1 further comprising a zero padding module coupled to the evaluation module and the compensation module, the zero padding module being configured to increase a sampling rate of the input signal.

7. The device of claim 1 wherein the evaluation module includes a chromatic dispersion (CD) equalizer module receiving the input signal and being configured to compensate for CD affecting the input signal;
   wherein the evaluation module includes a polarization mode dispersion (PMD) equalizer module coupled to the CD equalizer module, the PMD equalizer having a plurality of PMD taps and being configured to compensate for PMD affecting the input signal; and
   wherein the plurality of taps includes the plurality of PMD taps.

8. The system of claim 1 wherein the optical signal is a dual-polarization signal with an x-type polarization signal component and a y-type polarization signal component.

9. The system of claim 1 wherein the compensation module includes a non-adaptive frequency-domain (FD) equalizer, an adaptive FD equalizer, or both.

10. The system of claim 1 wherein the first SPE is computed according to a baud rate synchronization technique based on a Muller and Mueller phase error.

11. The system of claim 1 wherein the evaluation module includes a slicer module configured to derive a data stream from the input signal.

12. The system of claim 1 wherein the receiver device further comprising a zero padding module coupled to the evaluation module and the compensation module, the zero padding module being configured to increase a sampling rate of the input signal.

13. The system of claim 1 wherein the evaluation module includes a chromatic dispersion (CD) equalizer module receiving the input signal and being configured to compensate for CD affecting the input signal;
   wherein the evaluation module includes a polarization mode dispersion (PMD) equalizer module coupled to the CD equalizer module, the PMD equalizer having a plurality of PMD taps and being configured to compensate for PMD affecting the input signal; and
   wherein the plurality of taps includes the plurality of PMD taps.

14. An evaluation module device, the device comprising:
   a timing recovery (TR) module configured to receive a compensated input signal;

a first sampling phase error (SPE) module coupled to the TR module and being configured to compute a first SPE;

a second SPE module being configured to receive a plurality of taps signals and to compute a second SPE; and a combining module coupled to the first SPE module, the second SPE module, and the TR module; the combining module being configured to combine the first SPE and the second SPE into a total phase error (TPE);

wherein the TR module is configured to synchronize the compensated input signal using the TPE.

15. The device of claim 14 wherein the TR module includes an interpolated timing recovery (ITR) module and a TR filter;

wherein the ITR module is configured to receive the compensated input signal;

wherein the TR filter is coupled to the combining module and the ITR module, the TR filter being configured to receive the TPE from the combining module and to provide a filtered TPE to the ITR module; and wherein the ITR module is configured to synchronize the compensated input signal using the filtered TPE.

16. The device of claim 14 wherein the first SPE module includes a compression module and an error computation module;

wherein the compression module is coupled to the TR module and the error computation module, and the compression module is configured to compress the compensated input signal;

wherein the error computation module configured to compute the first SPE from the compressed, compensated input signal.

17. The device of claim 16 wherein the first SPE module further comprises a slicer module coupled to the compression module and the error computation module;

wherein the slicer module is configured to derive a data stream from the compensated input signal; and wherein the error computation module is further configured to compute a slicer error from the data stream.

18. The device of claim 16 wherein the second SPE module includes a timing phase information (TPI) module coupled to the combining module and configured to receive the plurality of taps signals;

wherein the TPI module is configured to compute the second SPE from the plurality of taps signals.

19. The device of claim 18 wherein the compensated input signal comprises an input signal compensated by a Chromatic Dispersion (CD) equalizer module and by a PMD equalizer module; and wherein the plurality of taps signals comprises a plurality of PMD taps signals.

20. An optical communication system, the system comprising:

an optical channel having a first end and a second end;

a transmitter device coupled to the first end of the optical channel;

a receiver device coupled to the second end of the optical channel, the receive device comprising:

a compensation module configured to receive an optical signal from the transmitter device over the optical channel, the compensation module having a plurality of taps;

an evaluation module coupled to the compensation module, the evaluation module being configured to compute a first sampling phase error (SPE);

a timing phase information (TPI) module coupled to the compensation module, the TPI module being configured to compute a second SPE from the plurality of taps; and a combining module coupled to the evaluation module and the TPI module, the combining module being configured to combine the first and second SPE into a total phase error (TPE).

* * * * *